United States Patent
Imamura et al.

(10) Patent No.: US 8,670,223 B2
(45) Date of Patent: Mar. 11, 2014

(54) CASE MOLD TYPE CAPACITOR

(75) Inventors: Takeshi Imamura, Toyama (JP);
Yoshinari Nagata, Toyama (JP);
Toshiharu Saito, Toyama (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/880,916

(22) PCT Filed: Dec. 22, 2011

(86) PCT No.: PCT/JP2011/007188
§ 371 (c)(1),
(2), (4) Date: Apr. 22, 2013

(87) PCT Pub. No.: WO2012/098622
PCT Pub. Date: Jul. 26, 2012

(65) Prior Publication Data
US 2013/0222967 A1    Aug. 29, 2013

(30) Foreign Application Priority Data

Jan. 21, 2011  (JP) ................................ 2011-010394

(51) Int. Cl.
*H01G 4/38* (2006.01)
*H01G 4/08* (2006.01)

(52) U.S. Cl.
USPC ......................................... 361/329; 361/323

(58) Field of Classification Search
USPC .......................................... 361/328, 329, 323
See application file for complete search history.

(56) References Cited

U.S. PATENT DOCUMENTS

2005/0263845 A1    12/2005    Saito et al.

FOREIGN PATENT DOCUMENTS

| JP | 57-47021 | | 8/1980 |
| JP | 2003-338425 A | | 11/2003 |
| JP | 2004-186640 A | | 7/2004 |
| JP | 2005-005467 A | | 1/2005 |
| JP | 2005-050996 A | | 2/2005 |
| JP | 2008-148530 A | | 6/2008 |
| JP | 2008-251595 A | | 10/2008 |
| JP | 2008288242 A | * | 11/2008 |
| JP | 2009259932 A | * | 11/2009 |
| WO | WO 2010067514 A1 | * | 6/2010 |

OTHER PUBLICATIONS

International Search Report issued in International Patent Application No. PCT/JP2011/007188 mailed on Mar. 13, 2012.

* cited by examiner

*Primary Examiner* — David M Sinclair
(74) *Attorney, Agent, or Firm* — McDermott Will & Emery LLP

(57) ABSTRACT

A case mold type capacitor is formed of multiple metalized film capacitors connected together in parallel and rigidly accommodated with molding resin within a case. The multiple metalized film capacitors are divided into a first block and a second block, and P-poles of each block confront each other, and N-poles thereof also confront each other. Bus-bars including a connection terminal for external connection at an end are connected to respective P-poles and N-poles of each block. The bus-bars connected to the P-poles are coupled together, and the bus-bars connected to the N-poles are coupled together. Each one of the bus-bars includes a section located on the opening side of the case with respect to the blocks. The bus-bars connected to the P-poles overlap in part, and the bus-bars connected to the N-poles also overlap in part.

9 Claims, 5 Drawing Sheets

CASE MOLD TYPE CAPACITOR

RELATED APPLICATIONS

This application is the U.S. National Phase under 35 U.S.C. §371 of International Application No. PCT/JP2011/007188, filed on Dec. 22, 2011, which in turn claims the benefit of Japanese Application No. 2011-010394, filed on Jan. 21, 2011, the disclosures of which Applications are incorporated by reference herein.

TECHNICAL FIELD

The present invention relates to a case mold type capacitor formed by molding a metalized film capacitor with resin within a case. More particularly, it relates to a case mold type capacitor to be used in a variety of electronic devices, electric apparatuses, industrial machines, and automobiles, and the capacitor is best-suited to a smoothing capacitor, filtering capacitor, or snubbering capacitor of an inverter circuit for driving a motor of a hybrid car.

BACKGROUND ART

In recent years, every electric apparatus is controlled by an inverter circuit in view of environmental protection in order to promote energy saving and to pursue higher efficiency. In the automobile industry, among others, a hybrid car (hereinafter referred to simply as HEV) driven with an electric motor and an engine has been introduced in the market, so that techniques pursuing environmental friendliness, energy saving, and higher efficiency are actively developed. Since the market demands maintenance-free products, HEV thus tends to adopt a metalized film capacitor that features an ultra long life.

The electric motor to be used in HEV works at as high as several hundreds volts, so that a metalized film capacitor having the following electric characteristics is strongly demanded: a high withstand voltage, capability of being charged and discharged with a large amount of current, a large capacitance, and a small loss at a high withstand voltage. To meet this requirement, a case mold type capacitor has been developed and commercialized. This case mold type capacitor is formed of multiple metalized film capacitors connected in parallel to each other with a bus bar and accommodated within a case, into which mold-resin is injected for fixing the film capacitors within the case.

FIG. 7 shows a structure of a conventional case mold type capacitor. This capacitor includes multiple capacitor elements 41, a pair of bus-bars 43, and case 45. Each of capacitor elements 41 is formed by winding two metalized films into a flat shape. Each of the films is made by depositing metal on single side of dielectric polypropylene film. Each of capacitor elements 41 includes metalized contact electrodes 42, working as electrodes, on both ends along the width direction of the metalized films. Electrodes 42 are formed by spraying zinc. Each of bus-bars 43 made of elongated copper connects the metalized contact electrodes 42 disposed on the ends of multiple capacitor elements 41 together. Each of bus-bars 43 includes electrode terminal 44 for external connection, and they are unitarily formed by bending. Case 45 is made of polyphenylene sulfide. Multiple capacitor elements 41 are arrayed in a line with their flat faces solidly contacted with each other along the same direction within case 45. Metalized contact electrodes 42 are provided to both the ends of each of capacitor elements 41, and they are roughly flush with each other on either ends respectively, and ones of electrodes 42 are disposed on an opening side and others of electrodes 42 are disposed on a bottom side of case 45. Bus-bars 43 connect the ones of electrodes 42 on the opening side of case 45 and the others of electrodes 42 on the bottom side of case 45, respectively. Electrode terminals 44 are disposed outside case 45. Case 45, in which multiple capacitor elements 41 and bus-bars 43 are disposed, is filled with sealing member, e.g. with epoxy resin 46, at empty spaces (the shaded area in FIG. 7 represents parts of the sealing member) for increasing reliability such as moisture resistance.

The structure discussed above allows increasing the capacitance as well as decreasing the number of components of conductive members for connecting the metalized contact electrodes 42 together. As a result, a wiring distance for connecting capacitor elements 41 together in parallel can be shortened. The foregoing case mold type capacitor is disclosed in, e.g. Patent Literature 1.

FIG. 8 shows another structure of the case mold type capacitor. In FIG. 8, multiple metalized film capacitors are disposed in parallel to each other, and the electrodes of respective capacitor elements are connected to each of bus-bars. Each of capacitor elements 1 includes end-face electrodes 2 at both ends thereof. Capacitor elements 1 are film capacitors, and end-face electrodes 2 are formed of metalized contacts. Three capacitor elements 1 are arrayed in parallel to each other and perpendicularly with respect to the direction of the pair of end-face electrodes 2, whereby capacitor element array 10A is formed. Another capacitor element array 10B having the same structure as array 10A is disposed adjacent to and in parallel with array 10A, whereby capacitor elements group 10C is formed.

First flat electrode 11 is disposed roughly in parallel with the arraying direction (the arraying plane) of capacitor elements 1. Second flat electrode 12 is disposed outside and roughly in parallel with the first flat electrode 11. In other words, second flat electrode 12 is located opposite to capacitor elements group 10C with respect to first flat electrode 11. First flat electrode 11and second flat electrode 12 are made of copper and shaped like a rectangular plate, and they have quadrangular openings 13 and 14 at their centers respectively. Openings 13 and 14 extend along capacitor element arrays 10A and 10B respectively. Opening 13 of first flat electrode 11 is greater than opening 14 of second flat electrode 12 both in width and length.

End-face electrodes 2 located inside capacitor element arrays 10A and 10B are connected to the rim of opening 14 of second flat electrode 12 with lead terminals 3B running through opening 13 of first flat electrode 11. End-face electrodes 2 located outside capacitor element arrays 10A and 10B are connected to both outer sides (lateral ends) of first flat electrode 11 with lead terminal 3A. Lead terminals 3A and 3B are made of, e.g. copper tape having a length of approx. several mm (not longer than 10 mm) to minimize the inductance. Lead terminals 3A and 3B can be integrally formed with end-face electrodes 2. The foregoing connecting structure allows connecting all of capacitor elements 1 in parallel to each other between first flat electrode 11 and second flat electrode 12.

Insulating paper or insulating film (not shown) is inserted between capacitor elements group 10C and first flat electrode 11, and between first flat electrode 11 and second flat electrode 12. This structure allows placing capacitor elements group 10C, first flat electrode 11, and second flat electrode 12 as close as possible to each other. This unit thus structured is housed within the case and then sealed with resin, e.g. epoxy resin, whereby the case mold type capacitor is completed. This capacitor has an electrostatic capacitance ranging from several hundreds μF to several thousands μF, and an inductance ranging from several nH to several tens nH, so that this capacitor is useful as a smoothing capacitor or the like of an inverter.

Since capacitor elements group 10C is molded with molding resin in the case, the case mold type capacitor is excellent in mechanical strength, heat resistance, and water resistance. This capacitor is thus highly reliable. The case mold type capacitor discussed above is disclosed in, e.g. Patent Literature 2.

However, when the case mold type capacitor shown in FIG. 7 is used in HEV or an electric vehicle, it cannot satisfy the electric characteristics such as low loss at high withstand voltage. On top of that, the greater thickness of molded resin may incur cracks or breakages in the capacitor case or the molded resin due to thermal shock supposed to occur in the vehicle.

The case mold type capacitor shown in FIG. 8 satisfies the electric characteristics of low loss at high withstand voltage; however, this capacitor needs complicated connections between end-face electrodes 2 and flat electrodes 11, 12 of capacitor elements 1. In particular, lead terminal 3B runs through opening 13 of first flat electrode 11 for connecting end-face electrode 2 located inside to the rim of opening 14 of second flat electrode 12. This connection causes a problem of insulation reliability between end-face electrode 2, lead terminal 3B and first flat electrode 11.

On top of that, here is a common problem: when two or more kinds of capacitors are arrayed along the same direction, and their end-face electrodes 42 or 2 are arrayed along the same direction, the metalized films for those capacitors should have approx. the same width. This limitation makes it difficult to find performance and shape optimum to each one of two or more kinds of capacitors.

CITATION LIST

Patent Literature

PTL1: Unexamined Japanese Patent Application Publication No. 2004-186640
PTL2: Unexamined Japanese Patent Application Publication No. 2005-005467

SUMMARY OF THE INVENTION

The present invention provides a case mold type capacitor excellent in the electric characteristics of low loss at high withstand voltage, although this capacitor is formed of two or more kinds of capacitors accommodated and molded within one case. This case mold type capacitor is manufactured at a lower cost, has features of small size and light weight, and can be designed efficiently.

The case mold type capacitor of the present invention includes first and second blocks, each of which is formed of a metalized film capacitor, first and second P-pole bus-bars, first and second N-pole bus-bars, a case, and molding resin. Each of the metalized film capacitors has P-pole and N-pole. The first P-pole bus-bar is connected to the P-pole of the metalized film capacitor in the first block, and includes a first P-pole terminal for external connection at an end thereof. The first N-pole bus-bar is connected to the N-pole of the metalized film capacitor in the first block, and includes a first N-pole terminal for external connection at an end thereof. The second P-pole bus-bar is connected to the P-pole of the metalized film capacitor in the second block, and includes a second P-pole terminal for external connection at an end thereof. The second N-pole bus-bar is connected to the N-pole of the metalized film capacitor in the second block, and includes a second N-pole terminal for external connection at an end thereof. The case has an opening at an upper section thereof, and accommodates the first block and the second block. The molding resin embeds therein the first and second blocks, the first P-pole bus-bar, the first N-pole bus-bar, the second P-pole bus-bar and the second N-pole bus-bar such that the first P-pole terminal, the first N-pole terminal, the second P-pole terminal, the second N-pole terminal are exposed. The P-pole of the metalized film capacitor in the first block confronts the P-pole of the metalized film capacitor in the second block, or the N-pole of the metalized film capacitor in the first block confronts that of the metalized film capacitor in the second block. The first P-pole terminal is connected to the second P-pole terminal, and the first N-pole terminal is connected to the second N-pole terminal. Each of the first P-pole bus-bar, the first N-pole bus-bar, the second P-pole bus-bar, and the second N-pole bus-bar has a portion located on the opening side of the case with respective to the first and second blocks. The first P-pole bus-bar partially overlaps the second P-pole bus-bar, and the first N-pole bus-bar partially overlaps the second N-pole bus-bar.

As discussed above, multiple metalized film capacitors are divided into blocks, thereby avoiding an extra long bus-bar for lowering a resistance of each block. Use of the metalized film capacitors allows achieving the electric characteristics of a greater capacitance, a higher withstand voltage, still more, lower loss. These features allow eliminating an excessive design for withstand current, so that a smaller size and lighter weight can be achieved. Use of the overlapped two bus-bars allows dissipating heat from the bus-bars efficiently in operation.

DESCRIPTION OF EMBODIMENTS

Figure 1A:
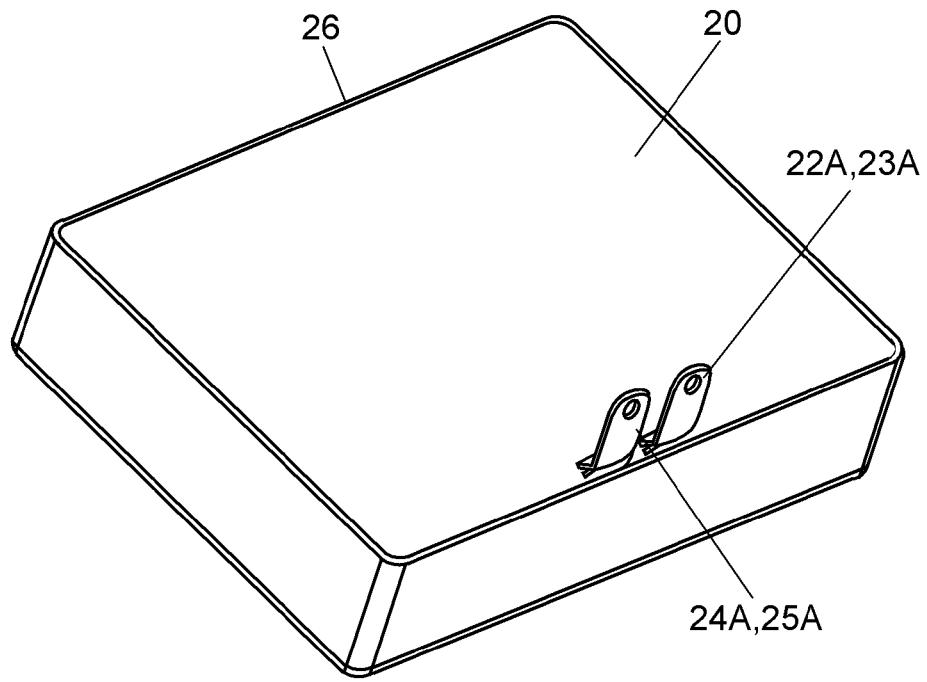
FIG. 1A is a perspective view of a case mold type capacitor in accordance with an embodiment of the present invention.
Figure 1B:
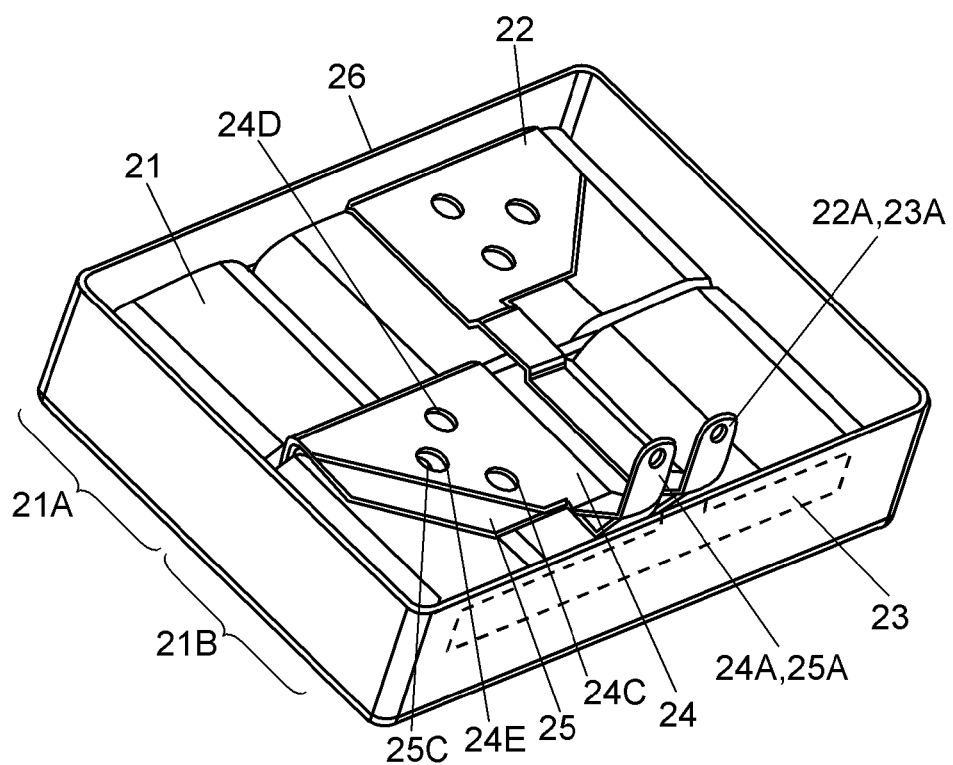
FIG. 1B is a perspective view of the case mold type capacitor shown in FIG. 1, before molding resin is injected therein.
Figure 2:
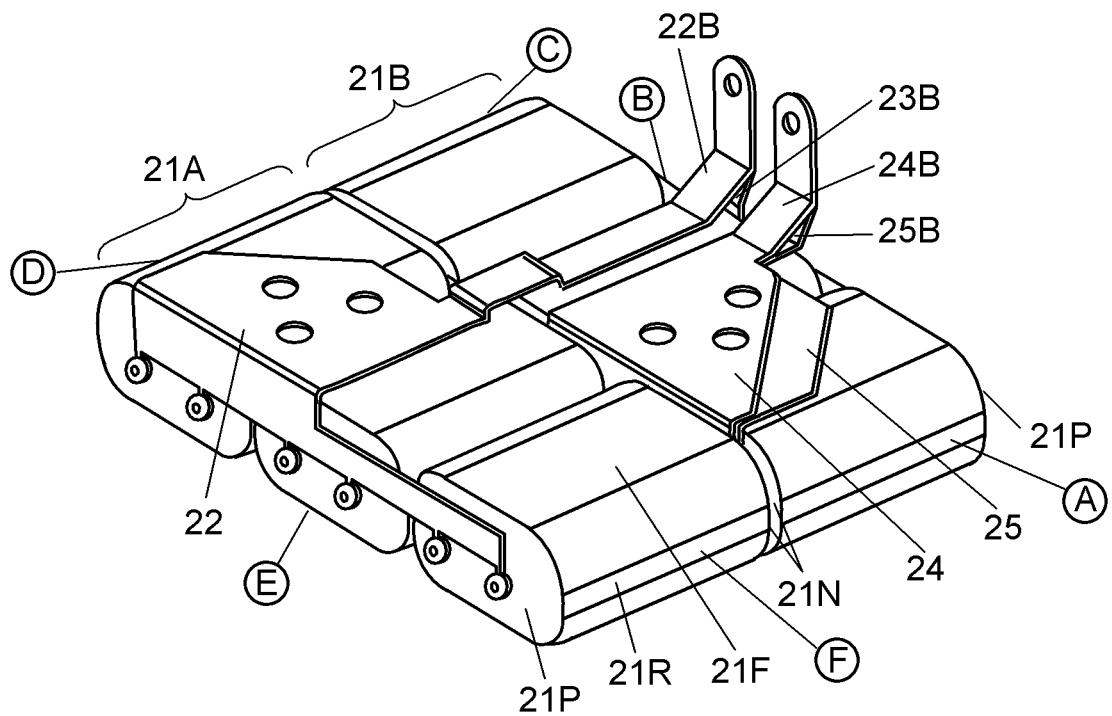
FIG. 2 is a perspective view of the case mold type capacitor shown in FIG. 1, before the capacitor is housed within a case.

FIG. 1A is a perspective view of a case mold type capacitor in accordance with the embodiment of the present invention. FIG. 1B is a perspective view of the case mold type capacitor before molding resin is injected therein. FIG. 2 is a perspective view of the case mold type capacitor before the capacitor is housed within a case.

As shown in FIG. 1B and FIG. 2, this case mold type capacitor includes first block 21A, first P-pole bus-bar 22, first N-pole bus-bar 24, second block 21B, second P-pole bus-bar 23, second N-pole bus-bar 25, and case 26. As shown in FIG. 1A, this case mold type capacitor further includes molding resin 20.

First block 21A and second block 21B (hereinafter simply referred to as blocks 21A and 21B) are respectively formed of multiple metalized film capacitors (hereinafter simply referred to as capacitors) 21 each having P-pole and N-pole. Each of block 21A and block 21B can be formed of a single capacitor 21. Respective N-poles of capacitors 21 in block 21A confront respective N-poles of capacitors 21 in block 21B.

First P-pole bus-bar (hereinafter simply referred to as P-pole bus-bar) 22 is connected to the P-poles of capacitors 21 in block 21A, and includes first P-pole terminal (hereinafter referred to as P-pole terminal) 22A at its first end for external connection. First N-pole bus-bar (hereinafter simply referred to as N-pole bus-bar) 24 is connected to the N-poles of capacitors 21 in block 21A, and includes first N-pole terminal (hereinafter referred to as N-pole terminal) 24A at its first end for external connection.

In a similar way, second P-pole bus-bar (hereinafter simply referred to as P-pole bus-bar) 23 is connected to the P-poles of capacitors 21 in block 21B, and includes second P-pole terminal (hereinafter referred to as P-pole terminal) 23A at its first end for external connection. Second N-pole bus-bar (hereinafter simply referred to as N-pole bus-bar) 25 is connected to the N-poles of capacitors 21 in block 21B, and includes second N-pole terminal (hereinafter referred to as N-pole terminal) 25A at its first end for external connection.

Case 26 has an opening at its upper section, and accommodates blocks 21A and 21B therein. Each of P-pole bus-bars 22, 23, and N-pole bus-bars 24, 25 has a portion located on the opening side with respect to blocks 21A and 21B. Molding resin 20 is injected into case 26, and embeds blocks 21A, 21B, P-pole bus-bars 22, 23, and N-pole bus-bars 24, 25 therein such that P-pole terminals 22A, 23A and N-pole terminals 24A, 25A are exposed.

As shown in FIG. 2, each of capacitors 21 is flat and includes a pair of end faces 21P, 21N which have a P-pole and an N-pole respectively. Capacitor 21 also includes a pair of principal flat faces 21F that connect end faces 21P and 21N together, and a pair of curved faces 21R that also connect end faces 21P and 21N together. Multiple capacitors 21 in blocks 21A and 21B are arrayed linearly such that respective upper principal faces 21A can be flush with each other as well as respective lower principal faces 21B can be flush with each other.

Capacitor 21 includes a pair of metalized films that are formed of metalized electrodes deposited on a single side or both sides of dielectric film, e.g. polypropylene. These metalized electrodes confront each other via the dielectric film disposed therebetween, and then they are wound together. Zinc is sprayed on both the end faces, thereby forming metal contact electrodes, which work respectively as output electrodes for the P-pole and the N-pole.

P-pole bus-bar 22 is formed by punching a metal sheet into an L-shape, and then bending the resultant L-shaped sheet. P-pole bus-bar 22 includes a junction (not shown) at its first end to be joined to the P-pole of capacitor 21, P-pole terminal 22A at its second end, and a flat section at its center portion. This center portion refers to the place where the junction to be joined to the P-pole of capacitor 21, P-pole terminal 22A, and first P-pole terminal reinforcing section 22B (described later) are excluded. The center portion of P-pole bus-bar 22 is located above blocks 21A and 21B, i.e. on the opening side of case 26.

The junction of P-pole bus-bar 22 includes two tongue-shaped solder sections (not shown) per capacitor 21 at its end section to be soldered to the P-poles respectively. The tongue-shaped sections are branched from the junction. The solder sections are soldered to the P-poles. P-pole terminal 22A is led out above capacitors 21 and exposed from molding resin 20 in case 26.

N-pole bus-bar 24 is also formed by punching a metal sheet into an L-shape, and then bending the resultant L-shaped metal sheet. N-pole bus-bar 24 includes a junction (not shown) at its first end to be joined to the N-pole of capacitor 21, N-pole terminal 24A at its second end, and a flat section at its center portion. The center portion of N-pole bus-bar 24 is located above block 21B, namely, on the opening side of case 26.

The junction of N-pole bus-bar 24 also includes two tongue-shaped solder sections (not shown) per capacitor 21 at its end section to be soldered to the N-pole of capacitor 21. The tongue-shaped sections are branched from the junction and soldered to the N-poles. N-pole terminal 24A is led out above capacitors 21 and exposed from molding resin 20 in case 26.

In block 21B, P-pole bus-bar 23 is connected to the P-poles of capacitors 21, and N-pole bus-bar 25 is connected to the N-poles.

P-pole bus-bar 23 is formed by punching a metal sheet into a square, and the resultant square metal sheet includes a junction (not shown) at its first longitudinal end to be joined to the P-poles of capacitors 21, and P-pole terminal 23A at its second end. The junction of P-pole bus-bar 23 includes two tongue-shaped solder sections (not shown) per capacitor 21 at its end section to be soldered to the P-pole. The tongue-shaped sections are branched from the junction, and soldered to the P-poles. P-pole terminal 23A is exposed from molding resin 20 in case 26.

N-pole bus-bar 25 is formed by punching a metal sheet into an L-shape, and then bending the resultant L-shaped metal sheet. N-pole bus-bar 25 includes a junction (not shown) at its first end to be joined to the N-poles, N-pole terminal 25A at its second end, and a flat section at its center portion. The center portion is located above block 21B, namely, on the opening side of case 26.

The junction of N-pole bus-bar 25 includes two tongue-shaped solder sections (not shown) per capacitor 21 at its end section to be soldered to the N-pole respectively. The tongue-shaped sections are branched from the junction, and soldered to the N-poles. N-pole terminal 25A is led out above capacitors 21 and exposed from molding resin 20 in case 26.

P-pole terminal 22A is connected to P-pole terminal 23A, and N-pole terminal 24A is connected to N-pole terminal 25A. To be more specific, P-pole terminals 22A and 23A are exposed from case 26, and overlapped and joined with each other there to form a connection terminal of the P-pole for external connection. On the other hand, N-pole bus-bars 24 and 25 are overlapped at their flat centers and above block 21B (on the opening side of case 26). N-pole terminals 24A and 25A expose from case 26, and overlapped and joined with each other there. They form a connection terminal of the N-pole for external connection.

As discussed above, the case mold type capacitor in accordance with the embodiment includes multiple metalized film capacitors 21 and they are divided into blocks 21A and 21B. Respective bus-bars of blocks 21A and 21B have the portions on the opening side of case 26 with respect to blocks 21A and 21B, and extend to the terminals with the shortest distances. This structure allows preventing the bus-bars from being extra long, whereby the resistance of each block can be lowered. Use of metalized film capacitors 21 allows increasing the capacitance of the case mold type capacitor, increasing the withstand voltage, and yet achieving lower loss. Therefore, an excessive design for withstand current is eliminated, so that the smaller and lighter case mold type capacitor can be obtained.

The N-poles of the divided capacitors 21 are confronted to each other, whereby the inductance of block 21A can be approx. equal to that of block 21B. N-pole bus-bars 24 and 25 are overlapped together to form a connection terminal for external connection, thereby reducing the heat generation from bus-bars 24 and 25 by half. This structure allows leading out the terminals for external connection along the same direction as N-pole bus-bars 24, 25 led out above capacitors 21, and no abnormal temperature rise in capacitors 21 can be found, and yet, this structure achieves reducing the cost.

In this embodiment, block 21A is connected to block 21B with the P-poles of capacitors 21 disposed outside and the N-poles of capacitors 21 disposed inside; however, the present invention is not limited to this structure, namely, the P-poles can be disposed inside. To be more specific, the P-poles of respective capacitors 21 in block 21A can confront the P-poles of respective capacitors 21 in block 21B. In this case, the first P-pole bus-bar and the second P-pole bus-bar are overlapped to form a connection terminal for external connection.

Blocks 21A and 21B are formed of multiple flat capacitors 21, and capacitors 21 are preferably arrayed linearly with their principal faces 21F being flush with each other. This structure allows improving the yield and reducing the cost. Principal faces 21F of capacitors 21 are placed in parallel with the bottom face of case 26, thereby improving heat dissipation. As a result, the electric characteristics of a lower loss with a greater capacitance at a higher withstand voltage can be achieved. Principal faces 21F, i.e. the flat faces of capacitors 21, are placed in parallel with the bottom face of case 26, whereby lower profile of the case mold type capacitor can be achieved.

N-pole bus-bar 24 overlaps N-pole bus-bar 25 at their flat centers above block 21B (the opening side of case 26). As discussed previously, N-pole terminal 24A and N-pole terminal 25A are exposed from case 26, and overlapped and joined with each other there to form the connection terminal for external connection. To shorten a route of electric current of N-pole bus-bars 24 and 25 for reducing the resistance, they must overlap above block 21B. The foregoing flat center sections form rather wider shapes, so that the heat generated from N-pole bus-bars 24 and 25 in operation can be dissipated efficiently.

As shown in FIG. 1B, above the top face of capacitor 21, i.e. on the opening side of case 26, N-pole bus-bars 24 and 25 overlap. It is notably preferable that N-pole bus-bar 25 located closer to capacitors 21 has a wider area of the flat center section than that of N-pole bus-bar 24 located closer to the opening side of case 26. To be more specific, the center section of N-pole bus-bar 24 forms roughly a triangle while that of N-pole bus-bar 25 has a flat trapezoid section in addition to an approx. triangle section on the oblique side of this triangle section.

The foregoing structure of N-pole bus-bars 24 and 25 shows that the flat trapezoid section of bus-bar 25 is not covered with bus-bar 24. In other words, before molding resin 20 that is not yet hardened, is injected into case 26, a part of bus-bar 25 is exposed from bus-bar 24 toward the opening side of case 26.

This structure allows molding resin 20 to fill into a space between bus-bars 24 and 25 with more ease from the flat trapezoid section of bus-bar 25, thereby preventing voids supposed to be filled with the resin from being produced. As a result, the reliability of the case mold type capacitor can be improved.

When the case mold type capacitor is mounted to HEV, among others, the capacitor is subjected to external vibration. Presence of the voids between N-pole bus-bars 24 and 25 will invite collision between bus-bar 24 and bus-bar 25 due to the vibration, and the collision probably incurs malfunction. The foregoing structure is thus important for the case mold type capacitor to be mounted in HEV.

In the case of an overlap between the P-pole bus-bars, a structure similar to the foregoing structure is required. Namely, at least a part of the first or second P-pole bus-bar, whichever is disposed closer to blocks 21A and 21B, is preferably exposed from the other bus-bar toward the opening side of case 26. In this case, the other bus-bar refers to P-pole bus-bar 22 or 23 whichever is located on the opening side of case 26.

Furthermore, as FIG. 1B shows, it is preferable that N-pole bus-bar 24 has three first through-holes (hereinafter referred to as through-hole) 24C, 24D, and 24E. The presence of through-holes 24C, 24D, and 24E allows molding resin 20, not yet hardened, to enter with more ease the space between bus-bars 24 and 25 as well as the spaces between bus-bar 25 and capacitors 21 through these through-holes. Molding resin 20 thus can be injected into case 26 exhaustively. Through-holes 24C, 24D, and 24E desirably shape like circles. Circular through-holes 24C, 24D, and 24E allow molding resin 20 to enter through-holes 24C, 24D, and 24E with more ease than polygonal through-holes. FIG. 1B shows three through-holes; however, the number of through-holes is not limited to three.

As shown in FIG. 1B, before molding resin 20 is injected into case 26, the top face of N-pole bus-bar 25 is exposed from through-holes 24C and 24D of N-pole bus-bar 24 toward the opening side of case 26. When molding resin 20 is injected into case 26, resin 20 enters through-holes 24D and 24E, and then firstly touches the top face of N-pole bus-bar 25, then diffuses gradually into the space between bus-bar 24 and bus-bar 25. As a result, molding resin 20 is injected sufficiently into the space between N-pole bus-bars 24 and 25.

In the case of the overlap between the P-pole bus-bars, a structure similar to what is discussed above is required. To be more specific, it is preferable to provide first through-holes to the first or the second P-pole bus-bar whichever is disposed on the opening side of case 26. It is also preferable that at least a part of the first or the second P-pole bus-bar, whichever is disposed closer to blocks 21A and 21B, is exposed from the first through-holes toward the opening of case 26.

N-pole bus-bar 25 has second through-hole (hereinafter referred to simply as through-hole) 25C at a place under through-hole 24E. In other words, through-hole 24E overlaps through-hole 25C, and yet, communicates with each other. The space above N-pole bus-bar 24 thus communicates with the space below N-pole bus-bar 25. As discussed above, before molding resin 20, not yet hardened, is injected into case 26, capacitor 21 is exposed from through-holes 24E and 25C toward the opening of case 26. When resin 20 is injected into case 26, this structure allows molding resin 20, not yet hardened, to enter through-holes 24E and 25C, and then enter the spaces between N-pole bus-bar 25 and capacitors 21. As a result, molding resin 20 can be injected exhaustively into case 26.

It is preferable that through-hole 25C is smaller than through hole 24E because a part of bus-bar 25 can be exposed from through hole 24E toward the opening of case 26. In this case, molding resin 20 entering through-hole 24E can partially flow onto the top face of bus-bar 25 exposed from through-hole 24E, and then can diffuse into the space between bus-bars 24 and 25.

Through-hole 25C of bus-bar 25 and through-hole 24E of bus-bar 24 are desirably disposed between capacitors 21 adjacent to each other. This structure allows molding resin 20 to enter, with more ease, the space surrounded by adjacent capacitors 21 and N-pole bus-bar 25, so that molding resin 20 can be injected into case 26 exhaustively.

In the case of an overlap between the P-pole bus-bars, a structure similar to what is discussed above is required. To be more specific, the first P-pole bus-bar or the second P-pole bus-bar, whichever is disposed closer to blocks 21A and 21B, preferably has a second through-hole at places overlapping the first through-hole. It is more preferable that the second through-hole is smaller than the first one, and the second through-hole is preferably disposed between adjacent two capacitors 21.

Capacitor 21 shapes flat, and includes principal faces 21F and a pair of curved faces 21R disposed on both sides of principal faces 21F. As FIG. 2 shows, when capacitors 21 are arrayed, curved faces 21R of adjacent capacitors 21 are brought into contact with each other or confront each other. Therefore, the foregoing location where through-hole 25C is disposed between adjacent capacitors 21 refers to the place over the curved faces 21R of adjacent capacitors 21. Before molding resin 20 is injected into case 26, through-hole 25C is placed such that a part of curved face 21R can be exposed from through-hole 25C, then the space surrounded by the adjacent capacitors 21 and N-pole bus-bar 25 can be filled with the molding resin.

It is particularly preferable that a part of principal face 21F and a part of curved face 21R of capacitor 21 are exposed from through-hole 25C toward the opening of case 26. This location of through-hole 25C allows molding resin 20 entering through-hole 25C to flow onto the top face (principal face 21F) of capacitor 21, and then to diffuse in the space between N-pole bus-bar 25 and the top face of capacitor 21. At the same time, remaining molding-resin 20 entering through-hole 25C is injected into the space surrounded by the adjacent capacitors 21 and N-pole bus-bar 25. As a result, the presence of through-hole 25C at the foregoing location allows molding resin 20 to be injected into case 26 exhaustively and more efficiently.

Next, the structure of the overlap between P-pole terminals 22A and 23A of P-pole bus-bars 22 and 23, and the structure of the overlap between N-pole terminals 24A and 25A of N-pole bus-bars 24 and 25 are described hereinafter with reference to FIG. 2.

FIG. 2 is a perspective view illustrating a state where P-pole bus-bars 22, 23 and N-pole bus-bars 24, 25 are joined to blocks 21A, 21B. P-pole bus-bar 22 is placed above blocks 21A, 21B (on the opening side of case 26). P-pole bus-bar 22 includes P-pole terminal 22A for external connection, and bus-bar 22 also includes first P-pole terminal reinforcing section 22B just before terminal 22A. P-pole bus-bar 23 also includes second P-pole terminal reinforcing section 23B just before P-pole terminal 23A. In other words, P-pole bus-bar 22 preferably includes P-pole terminal reinforcing section 22B adjacent to P-pole terminal 22A, and P-pole bus-bar 23 includes P-pole terminal reinforcing section 23B adjacent to P-pole terminal 23A.

In a similar way, N-pole bus-bar 24 is placed above block 21B of capacitors 21 (on the opening side of case 26). Bus-bar 24 includes N-pole terminal 24A for external connection and first N-pole terminal reinforcing section 24B just before N-pole terminal 24A. N-pole bus-bar 25 also includes second N-pole terminal reinforcing section 25B just before N-pole terminal 25A. It is thus preferable that N-pole bus-bar 24 includes N-pole terminal reinforcing section 24B adjacent to N-pole terminal 24A and also N-pole bus-bar 25 includes N-pole terminal reinforcing section 25B adjacent to N-pole terminal 25A.

P-pole terminal 22A and P-pole terminal 23A overlap and they are joined together, thereby forming the connection terminal for external connection as discussed previously. P-pole terminal reinforcing sections 22B and 23B adjacent to P-pole terminals 22A and 23A form a space therebetween and the space shapes triangular relative to a through direction of the space. N-pole terminal reinforcing sections 24B and 25B also form a triangular space relative to the through direction.

This structure allows P-pole terminals 22A, 23A and N-pole terminals 24A, 25A to more rigidly mount to molding resin 20. As a result, when the connection terminals are connected to an external component, the interface between P-pole terminals 22A, 23A and molding resin 20 cannot be damaged, which ensures a longer life of the capacitor.

The triangular space between P-terminal reinforcing sections 22B and 23B is preferably projected from the surface of molding resin 20 by at least 2 mm. The triangular space between N-terminal reinforcing sections 24B and 25B is also preferably projected from the surface of molding resin 20 by at least 2 mm. This structure allows preventing molding resin 20 from creeping up when the resin is injected into case 26, thereby reducing failures in connection of the connection terminals for external connection. The projection height necessary for this purpose somewhat depends on the width and thickness of the terminal reinforcing section as well as the viscosity of resin 20 not yet hardened. For instance, in the case of width is 15 mm and thickness is 0.6 mm of the reinforcing section, and viscosity of molding resin 20 is around 4000 mPa·s, the projection height can be at least 2 mm.

The spaces along the penetrating direction can shape square, or polygonal, and the smallest dimension of the spaces formed by the interfaces between two terminal reinforcing sections and molding resin 20 can be at least 20 mm.

Hereinafter, specific examples will prove the advantages of the embodiment. Six metalized film capacitors are used as capacitors 21 of which rated voltage is 600 VDC and capacitance is 400 µF. The six capacitors form the case mold type capacitor as shown in FIGS. 1A-2. The case mold type capacitor has rated voltage of 600 VDC and capacitance of 2400 µF, and is used at ambient temperature ranging from −40° C. to 90° C., and subjected to high-frequency ripple current of 70-100 A.

Figure 3:
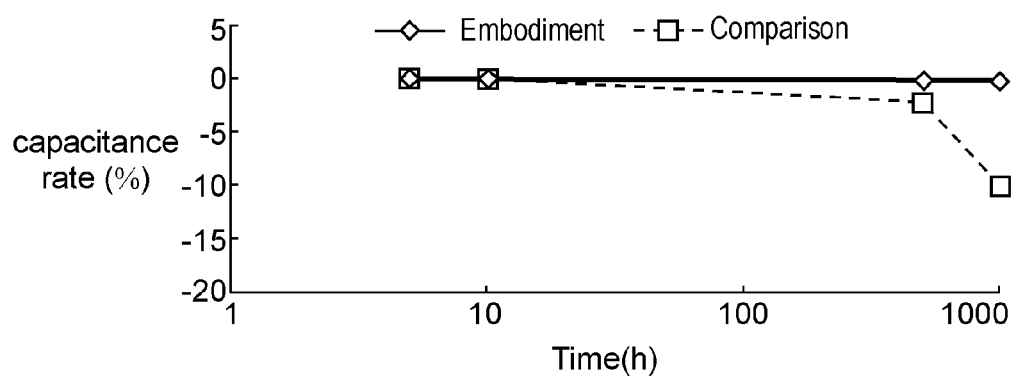
FIG. 3 is a graph showing a temporal change of a capacitance rate of the case mold type capacitor shown in FIG. 1A.
Figure 4:
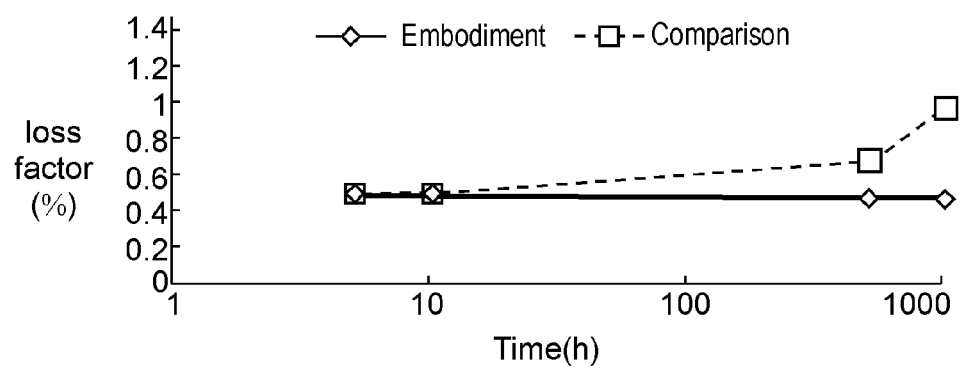
FIG. 4 is a graph showing a temporal change of a loss factor of the case mold type capacitor shown in FIG. 1A.

This case mold type capacitor undergoes the following accelerated test: a sine-wave ripple current of 100 A (frequency is 20 kHz) is applied to the capacitor at the atmospheric temperature of 90° C. for 1000 hours. FIG. 3 shows a rate of change in capacitance of capacitor 21. FIG. 4 shows changes in rate of loss. Table 1 shows the surface temperatures of capacitors 21 during the accelerated test.

Figure 5:
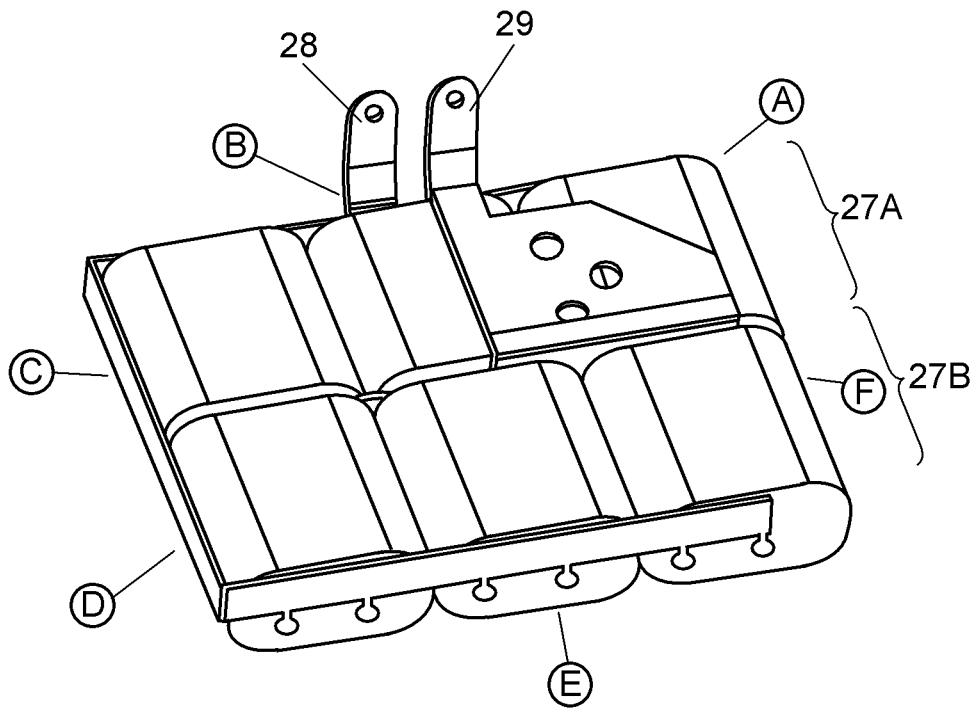
FIG. 5 is a perspective view of a structure of a capacitor block of a comparison formed for comparing with that in accordance with the embodiment of the present invention.

FIG. 5 shows a structure of a case mold type capacitor produced for a comparison purpose. This capacitor is formed of blocks 27A and 27B in which six capacitors 21 are arrayed similar to the structure shown in FIG. 2. P-poles are located outside blocks 27A and 27B, and N-poles are located inside of blocks 27A and 27B. The P-poles are connected together by P-pole bus-bar 28, and the N-poles are connected together by N-pole bus-bar 29. The capacitors-connected unit thus formed is molded with molding resin 20 in case 26 in the same manner as the embodiment.

TABLE 1

|  | Place A | Place B | Place C | Place D | Place E | Place F |
|---|---|---|---|---|---|---|
| Embodiment | 100.5° C. | 101.0° C. | 100.8° C. | 100.4° C. | 100.5° C. | 99.8° C. |
| Comparison | 101.5° C. | 113.0° C. | 102.1° C. | 100.8° C. | 100.4° C. | 100.8° C. |

As FIGS. 3 and 4 clearly show, the case mold type capacitor in accordance with the embodiment is better in the rate of change in capacitance and the rate of loss after around 1000 hours test than those of the comparison sample.

As shown in TABLE 1, the case mold type capacitance in accordance with the embodiment has a temperature lower than that of the comparison sample by 12° C. at the roots (place B) of respective pole terminals. The roots are subjected to the highest surface temperature among other parts. This feature proves that capacitors 21 encounter less heat damages, so that the electric characteristics of greater capacitance, lower loss at higher withstand voltage can be achieved. As a result, the case mold type capacitor of smaller size and lighter weight is obtainable.

P-pole bus-bar 22 in accordance with the embodiment is placed above blocks 21A, 21B (on the opening side of case 26), while P-pole bus-bar 28 of the comparison sample lies through places C and D, so that bus-bar 28 is longer than bus-bar 22 and has a greater inductance. As a result, it would appear that a resonance current concentrates locally on place B, whereby the temperature at place B rises.

As shown in FIG. 2, the connected unit of multiple capacitors 21 is formed this way: In the first place, three capacitors 21, P-pole bus-bar 22, and N-pole bus-bar 24 are assembled together into block 21A, and three capacitors 21, P-pole bus-bar 23, and N-pole bus-bar 25 are assembled into block 21B. Then blocks 21A and 21B are placed such that respective N-poles confront each other, and P-pole terminals 22A and 23A are overlapped together as well as N-pole terminals 24A and 25A are overlapped together. Blocks 21A, 21B thus can be assembled independently, which improves the workability.

Figure 6:
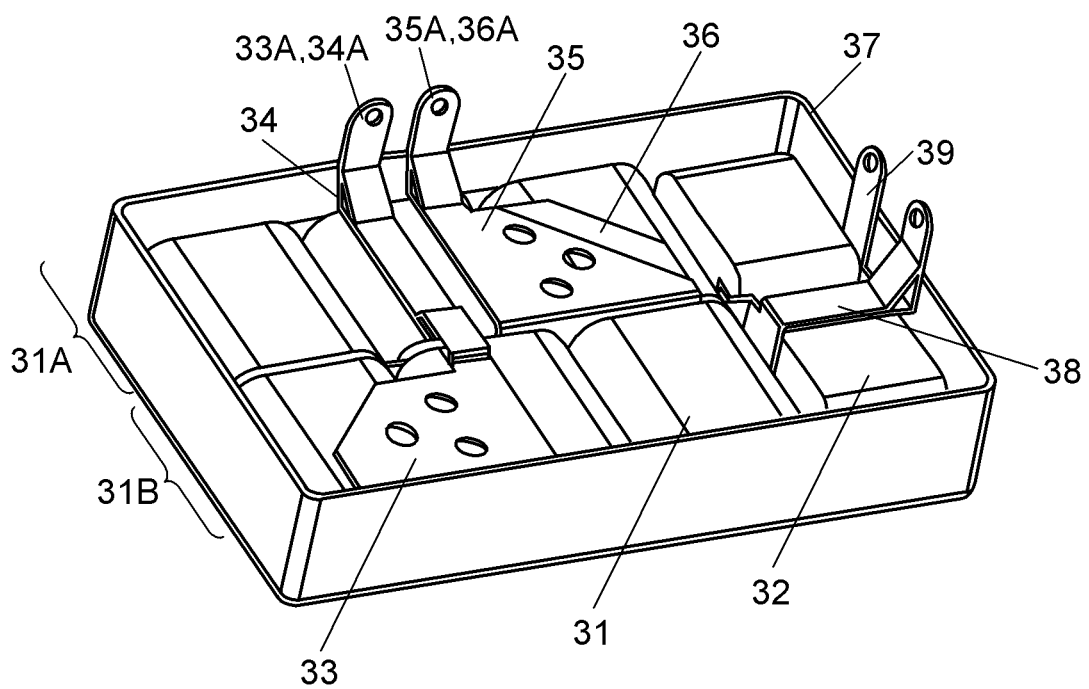
FIG. 6 is a perspective view of another case mold type capacitor in accordance with the embodiment, before the molding resin is injected therein.
Figure 7:
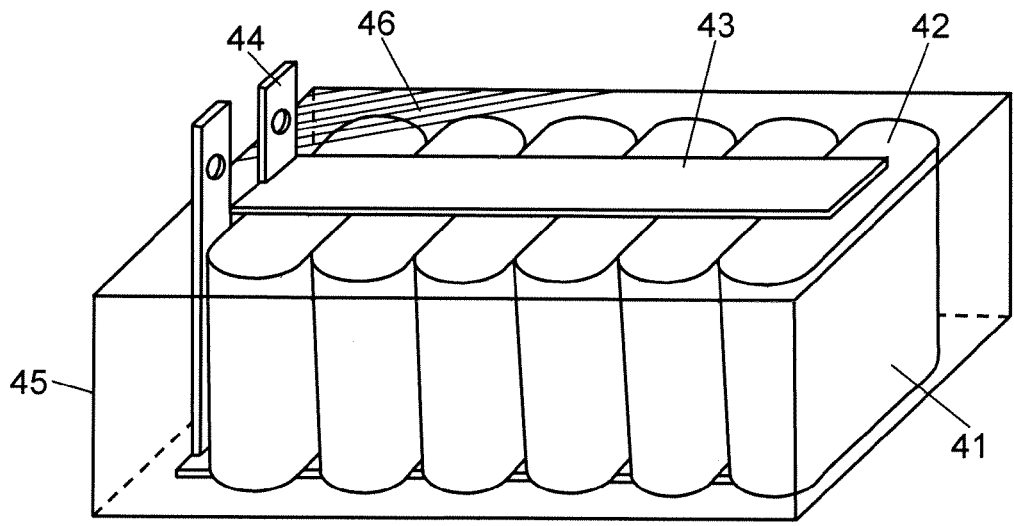
FIG. 7 is a perspective view showing a structure of a conventional case mold type capacitor.
Figure 8:
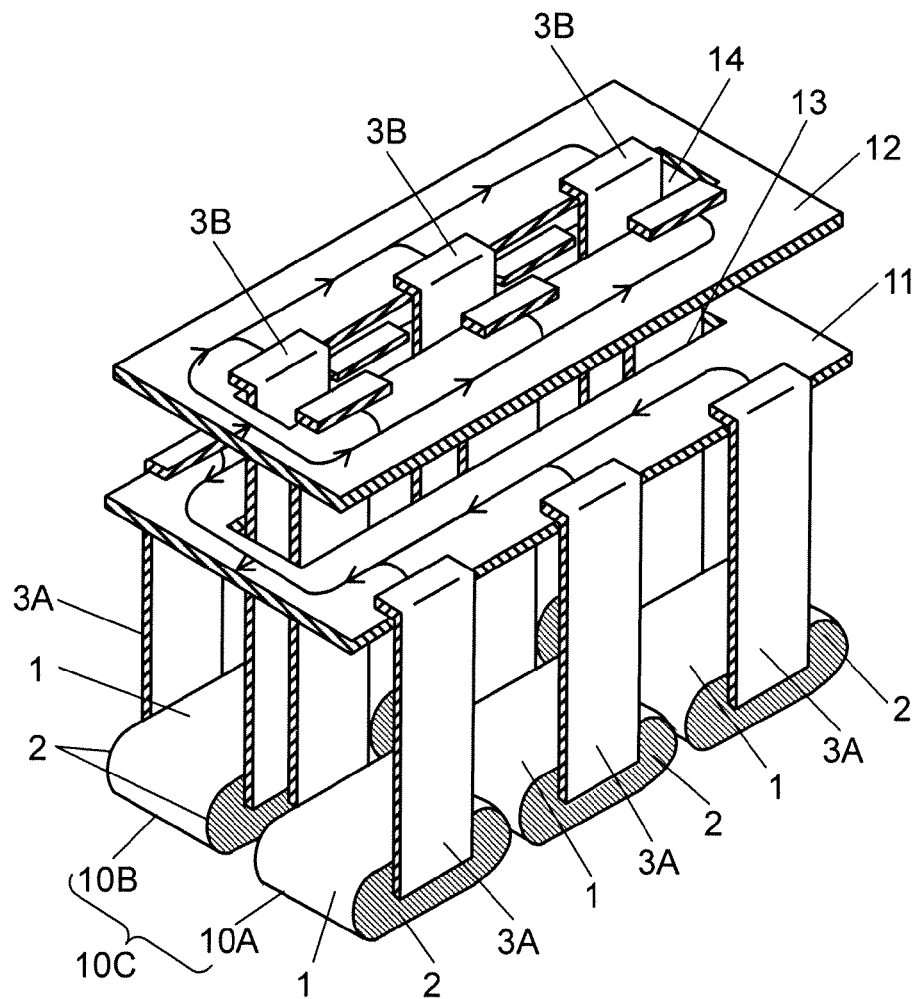
FIG. 8 is a perspective view showing a structure of another conventional case mold type capacitor.

A modification of the embodiment will be demonstrated hereinafter with reference to FIG. 6, which is a perspective view illustrating a modified sample of the case mold type capacitor in accordance with the embodiment of the present invention before the molding resin is injected. This case mold type capacitor includes multiple first capacitors 31 connected in parallel to each other and multiple second capacitors 32 connected in parallel to each other. First capacitors 31 are used as smoothing capacitors, and second capacitors 32 are used as filtering capacitors.

Multiple first capacitors 31 are arrayed to form first block 31A and second block 31B. These blocks are arrayed in two lines. Each of blocks 31A and 31B shown in FIG. 6 are formed of three first capacitors 31; however, the present invention is not limited to this.

In blocks 31A and 31B, P-pole bus-bars 33 and 34 are connected to respective P-poles, and N-pole bus-bars 35 and 36 are connected to respective N-poles.

Blocks 31A and 31B are disposed such that respective N-poles confront each other. P-pole terminals 33A and 34A of P-pole bus-bars 33 and 34 are exposed from case 37 to the outside, where they are overlapped and joined with each other to form as an external connection terminal of P-pole. N-pole terminals 35A and 36A are exposed from case 37 to the outside, where they are overlapped and joined with each other to form an external connection terminal of N-pole.

Two second capacitors 32 are joined with P-pole bus-bar 39 at their P-poles, and connected with N-pole bus-bar 38 at their N-poles. N-pole bus-bar 38 is connected to N-pole bus-bar 35, 36 within case 37. As a result, multiple first capacitors 31 are connected together in parallel, and multiple second capacitors 32 are also connected together in parallel, and yet, first capacitors 31 and second capacitors 32 are connected together in parallel.

The foregoing case mold type capacitor thus includes multiple first capacitors 31, bus-bars 33, 34, 35, and 36, and they are structured in a similar way to those shown in FIG. 1B, so that the foregoing modified sample produces advantages similar to those according the structures shown in FIG. 1B.

INDUSTRIAL APPLICABILITY

The case mold type capacitor of the present invention is excellent in the electric characteristics of lower loss at higher withstand voltage, and features an inexpensive cost and a lighter weight. An efficient design for downsizing the capacitor can be expected. This capacitor is useful particularly as a smoothing capacitor in an inverter circuit for driving a motor of a hybrid car.

The invention claimed is:
1. A case mold type capacitor comprising:
a first block including a metalized film capacitor that has a P-pole and an N-pole;
a first P-pole bus-bar connected to the P-pole of the metalized film capacitor of the first block, and including a first P-pole terminal at an end thereof for external connection;
a first N-pole bus-bar connected to the N-pole of the metalized film capacitor of the first block, and including a first N-pole terminal at an end thereof for external connection;
a second block including a metalized film capacitor that has a P-pole and an N-pole;
a second P-pole bus-bar connected to the P-pole of the metalized film capacitor of the second block, and including a second P-pole terminal at an end thereof for external connection;
a second N-pole bus-bar connected to the N-pole of the metalized film capacitor of the second block, and including a second N-pole terminal at an end thereof for external connection;
a case including an opening at an upper section and accommodating the first block and the second block; and
molding resin embedding the first block, the second block, the first P-pole bus-bar, the first N-pole bus-bar, the second P-pole bus-bar, and the second N-pole bus-bar therein such that the first P-pole terminal, the first N-pole terminal, the second P-pole terminal, and the second N-pole terminal are exposed therefrom,
wherein the P-pole of the metalized film capacitor of the first block confronts the P-pole of the metalized film capacitor of the second block, or the N-pole of the metalized film capacitor of the first block confronts the N-pole of the metalized film capacitor of the second block, the first P-pole terminal is connected to the second P-pole terminal, and the first N-pole terminal is connected to the second N-pole terminal, the first P-pole bus-bar, the first N-pole bus-bar, the second P-pole bus-bar, and the second N-pole bus-bar include sections disposed on an opening side of the case with respect to the first block and the second block, the first P-pole bus-bar and the second P-pole bus-bar overlap in part, and the first N-pole bus-bar and the second N-pole bus-bar overlap in part.

2. The case mold type capacitor according to claim 1, wherein each of the first block and the second block is formed of a plurality of metalized film capacitors, and each one of the plurality of metalized film capacitors shapes flat and includes a pair of end faces to which the P-pole and the N-pole are provided respectively, a pair of flat principal faces and a pair of curved faces connecting the pair of end faces together, and the plurality of metalized film capacitors are arrayed linearly such that the respective principal faces are flush with each other in the first block and the second block.

3. The case mold type capacitor according to claim 1, wherein before the molding resin is injected into the case, when the first P-pole bus-bar and the second P-pole bus-bar overlap on the opening side of the case with respect to the first block and the second block, at least a part of the first P-pole bus-bar or the second P-pole bus-bar whichever is disposed closer to the first block and the second block is exposed toward the opening side of the case from the first P-pole bus-bar or the second P-pole bus-bar whichever is disposed on the opening side of the case, and when the first N-pole bus-bar and the second N-pole bus-bar overlap on the opening side of the case with respect to the first block and the second block, at least a part of the first N-pole bus-bar or the second N-pole bus-bar whichever is disposed closer to the first block and the second block is exposed toward the opening side of the case from the first N-pole bus-bar or the second N-pole bus-bar whichever is disposed on the opening side of the case.

4. The case mold type capacitor according to claim 1, wherein when the first P-pole bus-bar and the second P-pole bus-bar overlap on the opening side of the case with respect to the first block and the second block, a first through-hole is provided to one of the first P-pole bus-bar and the second P-pole bus-bar that is disposed on the opening side of the case, and when the first N-pole bus-bar and the second N-pole bus-bar overlap on the opening side of the case with respect to the first block and the second block, a first through-hole is provided to one of the first N-pole bus-bar and the second N-pole bus-bar that is disposed on the opening side of the case.

5. The case mold type capacitor according to claim 4, wherein before the molding resin is injected into the case, when the first P-pole bus-bar and the second P-pole bus-bar overlap on the opening side of the case with respect to the first block and the second block, at least a part of the first P-pole bus-bar or the second P-pole bus-bar whichever is disposed closer to the first block and the second block is exposed toward the opening side of the case from the first through-hole, and when the first N-pole bus-bar and the second N-pole bus-bar overlap on the opening side of the case with respect to the first block and the second block, at least a part of the first N-pole bus-bar or the second N-pole bus-bar whichever is disposed closer to the first block and the second block is exposed toward the opening side of the case from the first through-hole.

6. The case mold type capacitor according to claim 4, wherein when the first P-pole bus-bar and the second P-pole bus-bar overlap on the opening side of the case with respect to the first block and the second block, a second through-hole is provided to one of the first P-pole bus-bar and the second P-pole bus-bar that is disposed closer to the first block and the second block such that the second through-hole overlaps the first through hole, and when the first N-pole bus-bar and the second N-pole bus-bar overlap on the opening side of the case with respect to the first block and the second block, a second through-hole is provided to one of the first N-pole bus-bar and the second N-pole bus-bar that is disposed closer to the first block and the second block such that the second through-hole overlaps the first through-hole.

7. The case mold type capacitor according to claim 6, wherein the second through-hole is smaller than the first through-hole.

8. The case mold type capacitor according to claim 6, wherein each of the first block and the second block is formed of a plurality of metalized film capacitors, and the second through hole is provided between two metalized film capacitors adjacent to each other.

9. The case mold type capacitor according to claim 1, wherein the first P-pole bus-bar includes a first P-pole terminal reinforcing section adjacent to the first P-pole terminal;

the first N-pole bus-bar includes a first N-pole terminal reinforcing section adjacent to the first N-pole terminal;

the second P-pole bus-bar includes a second P-pole terminal reinforcing section adjacent to the second P-pole terminal;

the second N-pole bus-bar includes a second N-pole terminal reinforcing section adjacent to the second N-pole terminal;

a space is provided between the first P-pole terminal reinforcing section and the second P-pole terminal reinforcing section so as to project from the molding resin, and a space is provided between the first N-pole terminal reinforcing section and the second N-pole terminal reinforcing section so as to project from the molding resin.

\* \* \* \* \*